(12) United States Patent
Kim

(10) Patent No.: US 9,018,910 B2
(45) Date of Patent: Apr. 28, 2015

(54) BATTERY PROTECTION CIRCUIT AND METHOD OF CONTROLLING THE SAME

(75) Inventor: Woo-Choul Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 1045 days.

(21) Appl. No.: 13/005,167

(22) Filed: Jan. 12, 2011

(65) Prior Publication Data

US 2011/0304302 A1 Dec. 15, 2011

(30) Foreign Application Priority Data

Jun. 10, 2010 (KR) ........................ 10-2010-0055103

(51) Int. Cl.
*H02J 7/00* (2006.01)
(52) U.S. Cl.
CPC .................................. *H02J 7/0026* (2013.01)
(58) Field of Classification Search
USPC ........................................................ 320/134
See application file for complete search history.

(56) References Cited

U.S. PATENT DOCUMENTS

| | | | | |
|---|---|---|---|---|
| 5,963,019 | A * | 10/1999 | Cheon | 320/150 |
| 6,437,540 | B2 * | 8/2002 | Sonobe | 320/134 |
| 2007/0164709 | A1 | 7/2007 | Tsubaki et al. | |
| 2009/0009008 | A1 * | 1/2009 | Heinrich | 307/112 |
| 2009/0179618 | A1 * | 7/2009 | LiTingTun | 320/136 |
| 2010/0253285 | A1 * | 10/2010 | Takahashi et al. | 320/118 |

FOREIGN PATENT DOCUMENTS

| | | |
|---|---|---|
| JP | 3825387 B2 | 7/2006 |
| KR | 10-2006-0022557 A | 3/2006 |
| KR | 10-0621072 B1 | 8/2006 |
| KR | 10-2007-0024606 (A) | 3/2007 |
| KR | 10-2007-0101895 (A) | 10/2007 |
| KR | 10-2008-0092151 A | 10/2008 |

OTHER PUBLICATIONS

Korean Registration Determination Certificate dated Dec. 21, 2011 for Korean Patent Application No. KR 10-2010-0055103 which corresponds to captioned U.S. Appl. No. 13/005,167.

* cited by examiner

*Primary Examiner* — Edward Tso
*Assistant Examiner* — Johali Torres Ruiz
(74) *Attorney, Agent, or Firm* — Knobbe Martens Olson & Bear LLP

(57) ABSTRACT

A battery protection circuit and a method of controlling the same are disclosed. The battery protection circuit includes a first current path that includes a charge control switch and a discharge control switch, and a second current path in parallel to the first current path and has an electric resistance less than that of the first current path.

21 Claims, 6 Drawing Sheets

BATTERY PROTECTION CIRCUIT AND METHOD OF CONTROLLING THE SAME

CROSS-REFERENCE TO RELATED APPLICATIONS

This application claims the benefit of Korean Patent Application No. 10-2010-0055103, filed on Jun. 10, 2010, in the Korean Intellectual Property Office, the disclosures of which are incorporated herein in their entirety by reference.

BACKGROUND

1. Field

The disclosed technology relates a battery protection circuit and a method of controlling the same.

2. Description of the Related Technology

Because mobile electronic devices, e.g., mobile phones, digital cameras, and laptop computers, are widely used, and power is a significant concern, batteries for supplying power to operate such devices are actively being developed.

A battery is generally manufactured as a battery pack including a battery cell and a protection circuit that controls charge and discharge of the battery cell. Batteries may be categorized based on their battery cell type. For example, a battery may be a lithium ion (Li-ion) battery, a nickel cadmium (Ni—Cd) battery, or the like. Such battery cells are secondary batteries, which may be recharged and reused.

SUMMARY OF CERTAIN INVENTIVE ASPECTS

One inventive aspect is a battery protection circuit, which includes a first current path with a charge control switch and a discharge control switch connected in series between a first node connected to a first electrode of a battery cell and a second node connected to an external device. The circuit also includes a second current path between the first node and the second node in parallel with the first current path, where the second current path has resistance less than that of the first current path, and where the second current path is configured to conditionally block current therein. The circuit also includes a control integrated circuit (IC) for controlling current blocking in the first current path.

Another inventive aspect is a method of controlling a battery protection circuit for a battery cell. The method includes passing current in both a first current path including a charge control switch and a discharge control switch, and a second current path parallel to the first current path. The second current path has a resistance which is less than the resistance of the first current path.

Another inventive aspect is a battery protection circuit. The circuit includes a first current path with a charge control switch and a discharge control switch that are connected in series between a first node connected to a first electrode of a battery cell and a second node connected to an external device. The circuit also includes a second current path between the first node and the second node in parallel with the first current path. The second current path has resistance less than that of the first current path, and the second current path includes a first current blocking unit. The circuit also includes a third current path between the second node and a third node connected to the external device. The third current path includes a short control switch and a second current blocking unit. The circuit also includes a control integrated circuit (IC) for controlling the charge control switch, the discharge control switch, and the short control switch.

DETAILED DESCRIPTION OF CERTAIN INVENTIVE EMBODIMENTS

Figure 1:
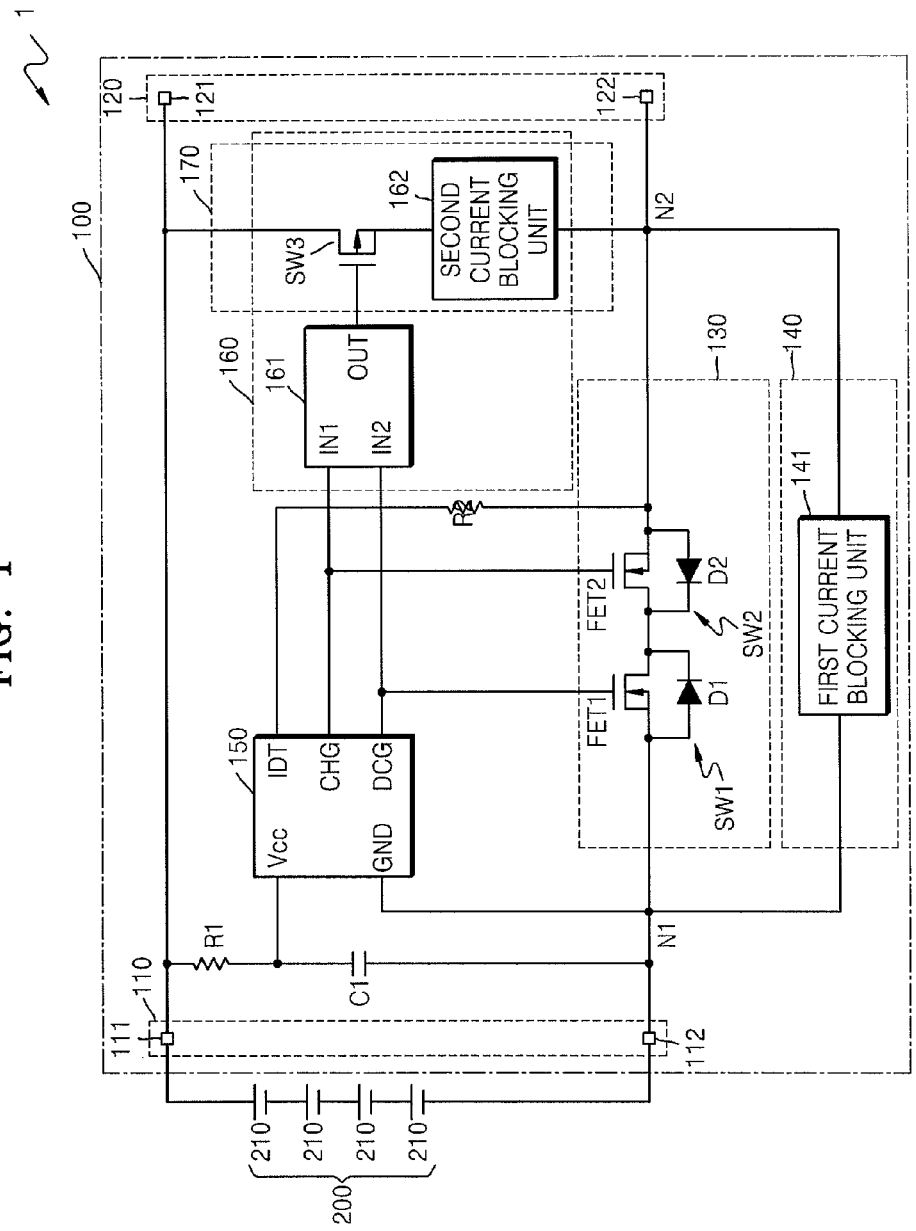
FIG. 1 is a circuit diagram showing a battery pack according to an embodiment.

Certain embodiments are described below in more detail with reference to the accompanying drawings. Those components that are the same or are in correspondence are generally given the same reference numeral regardless of the figure number, and some redundant explanations are omitted.

In some instances, detailed description of certain technologies or structures related to the invention may unnecessarily obscure the subject matter of the embodiments. Accordingly, such detailed description is omitted.

FIG. 1 is a circuit diagram showing a battery pack 1 according to an embodiment. The battery pack 1 includes a battery protection circuit 100 (referred to hereinafter as a 'protection circuit') and a battery cell 200.

The battery cell 200 may include one or more bare cells 210. The battery cell 200 is connected to a battery connection terminal 110 of the protection circuit 100, and, when an external connection terminal 120 of the protection circuit 100 is connected to an external device, the battery cell 200 is charged or discharged. Each bare cell 210 includes an electrode assembly including a positive electrode plate, a negative electrode panel, and a separator, a can housing the electrode assembly and having an opening on a top surface of the can, and a cap assembly arranged on the opening of the can to seal the can. The battery cell 200 is a secondary battery that may be recharged and reused.

The protection circuit 100 controls charging and discharging of the battery cell 200, and detects abnormalities in the battery cell 200 to prevent the battery cell 200 from being damaged. The protection circuit 100 may include the battery connection terminal 110, the external connection terminal 120, a first current path 130, a second current path 140, a control integrated circuit (IC) 150, and a short control circuit 160.

The battery connection terminal 110 is connected to the battery cell 200 and receives power from the battery cell 200 or supplies power to the battery cell 200. The battery connection terminal 110 includes a positive electrode terminal 111 connected to a positive electrode of the battery cell 200, and a negative electrode terminal 112 connected to a negative electrode of the battery 200.

The external connection terminal 120 can be connected to a charger or an external device. An external device may be a load consuming power of the battery cell 200, e.g., a mobile phone or a laptop computer. The external connection terminal 120 includes a positive electrode terminal 121 and a negative electrode terminal 122. When the external connection terminal 120 is connected to a charger, current flows into the protection circuit 100 via the positive electrode terminal 121 and current flows out of the protection circuit 100 via the negative electrode terminal 122, and the battery cell 200 is charged. On the contrary, when the external connection terminal 120 is connected to an external device, current flows out of the protection circuit 100 via the positive electrode terminal 121 and current flows into the protection circuit 100 via the negative electrode terminal 122, and thus the battery cell 200 is discharged.

The first current path 130 is a high current path used as a charging/discharging path between a first node Ni connected to the negative electrode terminal 112 of the battery connection terminal 110, and a second node N2 connected to the negative electrode terminal 122 of the external connection terminal 120. A relatively high current flows via the first current path 130.

A charge control switch SW2 and a discharge control switch SW1 for controlling flow of the charging current and the discharging current, respectively, are formed on the first current path 130. The discharge control switch SW1 and the charge control switch SW2 are connected in series between the first node N1 and the second node N2. The discharge control switch SW1 and the charge control switch SW2 are turned on and turned off according to a charge control signal and a discharge control signal applied from the control IC 150.

Each of the discharge control switch SW1 and the charge control switch SW2 includes a field effect transistor (FET) and a parasitic diode. In other words, the discharge control switch SW1 includes an FET FET1 and a parasitic diode D1, and the charge control switch SW2 includes an FET FET2 and a parasitic diode D2. A direction in which a source and a drain of the FET FET1 of the discharge control switch SW1 are connected to the first current path 130 is configured to be opposite to a direction in which a source and a drain of the FET FET2 of the charge control switch SW2 are connected to the first current path 130. Accordingly, the FET FET1 of the discharge control switch SW1 is connected to limit flow of current from the negative electrode terminal 122 of the external connection terminal 120 to the negative electrode terminal 112 of the battery cell 200, whereas the FET FET2 of the charge control switch SW2 is connected to limit flow of current from the negative electrode terminal 112 of the battery cell 200 to the negative electrode terminal 122 of the external connection terminal 120. The FETs FET1 and FET2 of the discharge control switch SW1 and the charge control switch SW2 are switching devices, however, the various embodiments are not limited thereto, and any of various electronic devices performing various types of switching functions may be used. Furthermore, each of the parasitic diodes D1 and D2 of the discharge control switch SW1 and the charge control switch SW2 is configured such that a current flows therethrough in a direction opposite to the direction in which flow of current is limited by the FET corresponding thereto.

The second current path 140 is a high current path used as a charging/discharging path and is connected between the first node Ni and the second node N2 in parallel with the first current path 130. When the battery cell 200 is operating normally, the current flowing through the second current path 140 is greater than the current flowing through the first current path 130. The second current path 140 is at least partly for reducing impedance on the charging/discharging path and has a lower electric resistance than that of the first current path 130.

A first current blocking unit 141 is formed on the second current path 140 and controls flow of current according to the amount of a current flowing in the second current path 140. The purpose of the second current path 140 is at least partly to conduct the charging or discharging current when the battery cell 200 is operating normally, and to block current in the second current path 140 when the battery cell 200 is not operating normally, e.g., when there is an overcurrent in the battery cell 200. Therefore, the first current blocking unit 141 may, for example, include a fuse to block flow of current when an excessive amount of a current flows in the second current path 140. Alternatively, the first current blocking unit 141 may include a positive temperature coefficient PTC thermistor that may limit flow of current through the second current path 140 by having an electric resistance that increases when the amount of the current flowing through the second current path 140 increases. However, the fuse and the PTC thermistor in the present embodiment are merely examples, and any of various devices or apparatuses for blocking current in the second current path 140 when an excessive amount of the current flows in the second current path 140 may be used.

The control IC 150 controls overall operation of the protection circuit 100 and performs general controls for charging and discharging the battery cell 200. The control IC 150 detects a charge/discharge status of the battery cell 200 and a status of a current flowing in the battery pack 1, and generates a charge control signal or discharge control signal based on results of the detected statuses. The control IC 150 outputs a generated charge control signal via a charge signal terminal CHG or a generated discharge control signal via a discharge signal terminal DHG. The control IC 150 receives a power voltage applied via a Vcc terminal, and receives a ground voltage via a GND terminal. Furthermore, the control IC 150 detects if there is an overcurrent flowing in the protection circuit 100 via an IDT terminal.

When an abnormality is detected in the battery cell 200, the control IC 150 blocks current flowing in the first current path 130. Detailed descriptions on an operation of blocking a current will be described below with reference to FIGS. 2 through 6.

The short control unit 160 is a circuit that selectively forms a short circuit and increases the amount of current flowing in the second current path 140, when there is an abnormality in the battery cell 200. The short circuit may also be referred to as a third current path 170. The short control unit 160 is formed between the positive electrode terminal 111 of the battery connection terminal 110 and the second node N2. The short control unit 160 includes a short control switch SW3, a switching control unit 161, and a second current blocking unit 162.

The short control switch SW3 is a switching device that controls flow of a current in the third current path 170.

The switching control unit 161 receives control signals from the control IC 150 via input terminals IN1 and IN2 and outputs a control signal for controlling switching of the short control switch SW3 via an OUT terminal. When there is an abnormality in the battery cell 200, the switching control unit 161 is activated such that the short control switch SW3 is turned on. Furthermore, from the control signals generated by the control IC 150, the switching control unit 161 may use the charge control signal and the discharge control signal to control switching of the short control switch SW3. For example, when the discharge control switch SW1 and the charge control switch SW2 are NMOS transistors, high level signals are output as the discharge control signal and the charge control signal when the battery cell 200 is normal. Furthermore, when the battery cell 200 is normal, the short control switch SW3 is turned off. If, however, there is an abnormality in the battery cell 200, either a discharge control signal or a charge control signal is output as a low level signal, and the other is output as a high level signal. Furthermore, when there is an abnormality in the battery cell 200, the short control switch SW3 is turned on. Therefore, the short control switch SW3 may be a PMOS transistor, and the switching control unit 161 may be an AND GATE logic device. However, embodiments are not limited thereto, and any of various modifications may be made. For example, the discharge control switch SW1, the charge control switch SW2, and the short control switch SW3 may all be NMOS transistors, and the switching control unit 161 may be a NAND GATE logic device.

The second current blocking unit 162 controls flow of current according to the amount of a current flowing in the third current path 170. The third current path 170 temporarily allows current when there is an abnormality in the battery cell 200, and blocks flow of current again after a certain time has elapsed. Therefore, the second current blocking unit 162 may include a fuse to block current when an excessive amount of a current flows in the third current path 170. Alternatively, the second current blocking unit 162 may include a PTC thermistor that may limit flow of current through the third current path 170 by having an electric resistance that increases when the amount of current flowing through the third current path 170 increases. In the present embodiment, current flowing in the third current path 170 is blocked after a current flowing in the second current path 140 is blocked. Therefore, a fuse in the first current blocking unit 141 is blown before a fuse in the second current blocking unit 162 is blown. In other words, the rated current of the fuse in the first current blocking unit 141 is less than the rated current of the fuse in the second current blocking unit 162. Alternatively, If a PTC thermistor is used, the Curie temperature of the PTC thermistor in the first current blocking unit 141 is lower than the Curie temperature of the PTC thermistor in the second current blocking unit 162.

Functionality of the protection circuit 100 according to the some embodiments is described with reference to FIGS. 2 through 6.

Figure 2:
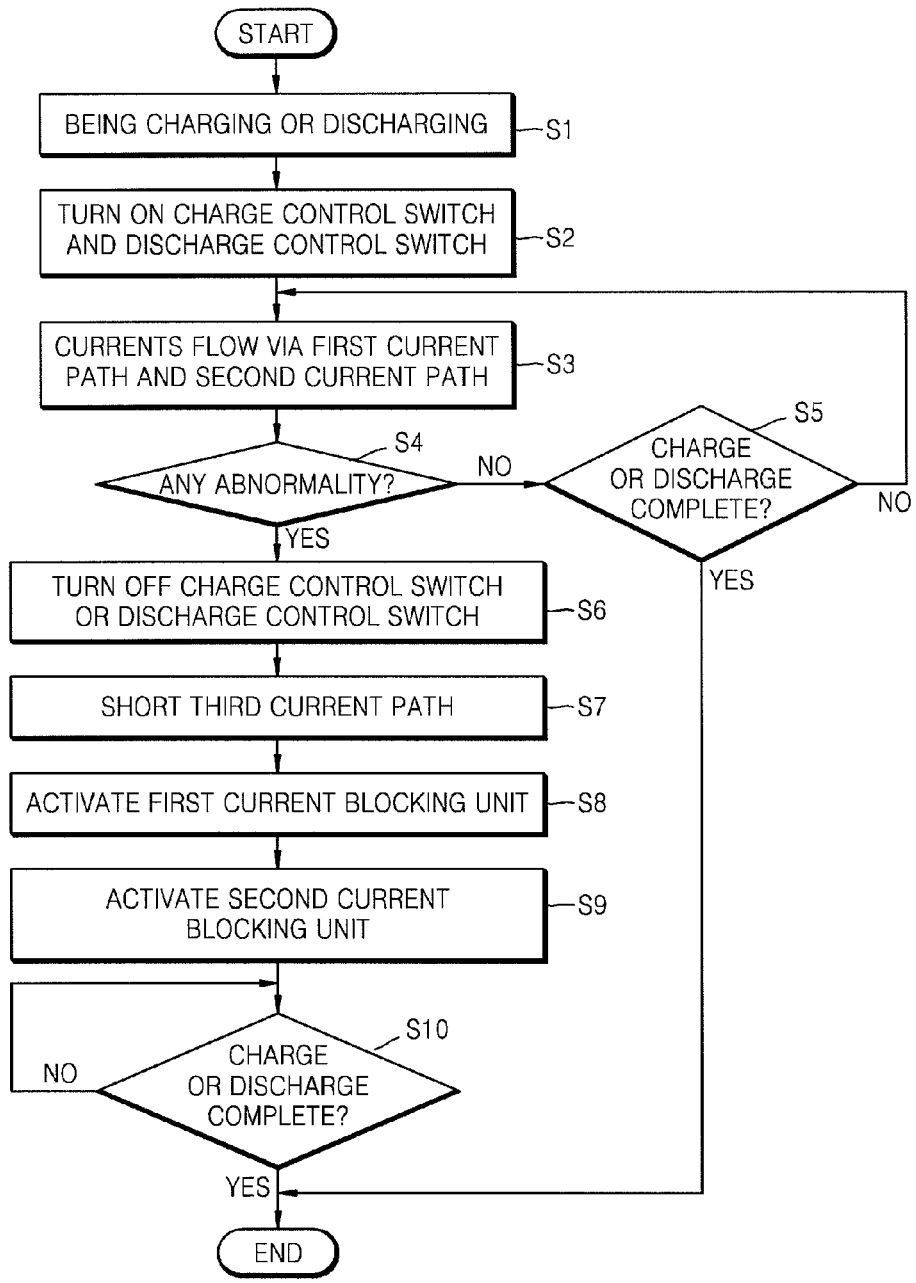
FIG. 2 is a flowchart of a method of controlling the battery pack according to an embodiment.

FIG. 2 is a flowchart of a method of controlling the battery pack 1 according to an embodiment. FIGS. 3 through 6 are diagrams showing functionality of the battery pack 1 of FIG. 1. For convenience of explanation, in this embodiment, the discharge control switch SW1 and the charge control switch SW2 are NMOS transistors and the short control switch SW3 is a PMOS transistor. Furthermore, in this embodiment, the switching control unit 161 is an AND GATE logic device.

Referring to FIG. 2, when a charger or an external device is connected to the battery pack 1, a charging operation or a discharging operation by the battery cell 200 begins (operation S1).

For a charging current or a discharging current to flow, the control IC 150 turns on the discharge control switch SW1 and the charge control switch SW2 (operation S2). Furthermore, the first current blocking unit 141 is not activated in the second current path 140, and thus either a charging current or a discharging current flows in both the first current path 130 and the second current path 140 simultaneously (operation S3).

Figure 3:
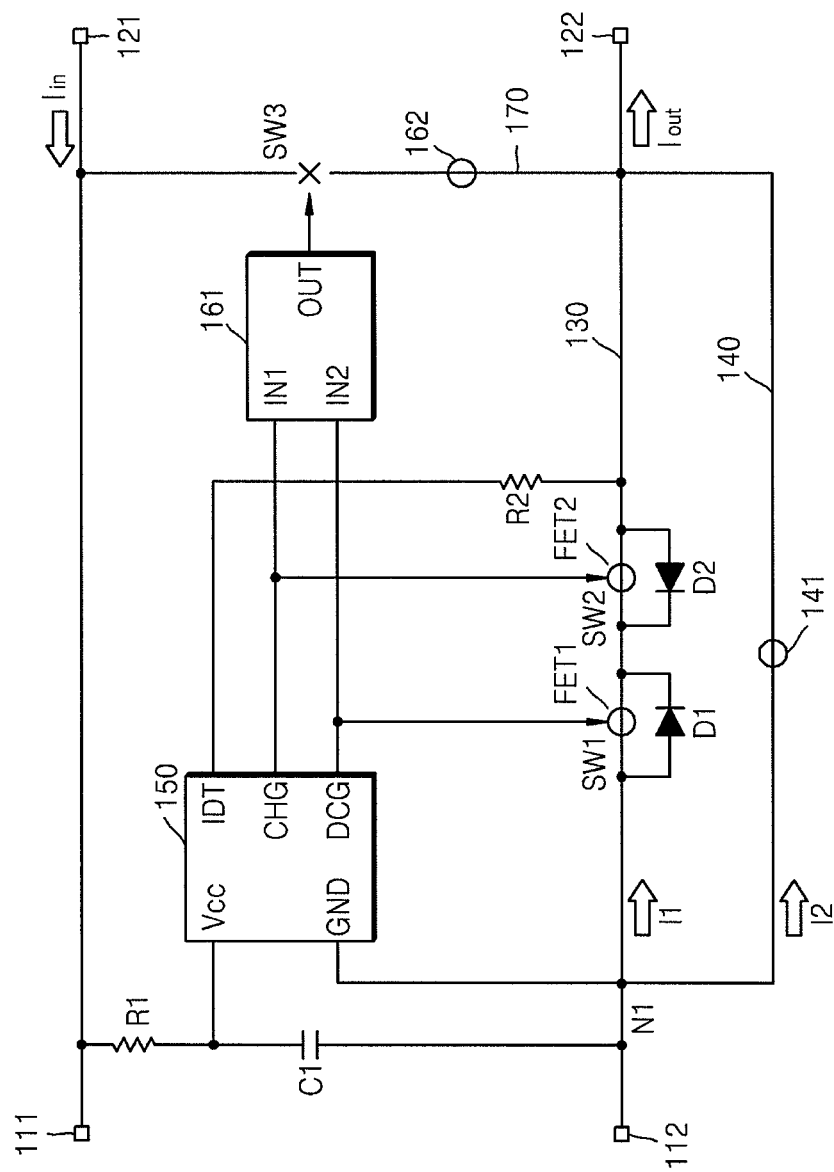
FIGS. 3 through 6 are schematic diagrams showing functionality of the battery pack of FIG. 1.

Referring to FIG. 3, during charging, a charging current Iin flows into the protection circuit 100 via the positive electrode terminal 121 of the external connection terminal 120. The charging current is applied to the positive electrode of the battery cell 200, and then flows to the negative electrode terminal 112 of the battery connection terminal 110 from the negative electrode of the battery cell 200. The current flowing out of the negative electrode terminal 112 of the battery connection terminal 110 is divided into a first current I1 flowing in the first current path 130 and a second current I2 flowing in the second current path 140, and a current Iout is output out of the protection circuit via the negative electrode terminal 122 of the external connection terminal 120.

The discharge control switch SW1 and the charge control switch SW2 are formed on the first current path 130, where each of the discharge control switch SW1 and the charge control switch SW2 has an electric resistance of about 20 mΩ when in a turned-on state. Since the discharge control switch SW1 and the charge control switch SW2 are connected in series, a voltage drop due to an electric resistance of about 40 mΩ occurs during discharging and charging operations. However, according to the present embodiment, the second current path 140, which has a significantly lower electric resistance, is formed in parallel to the first current path 130, and thus the overall electric resistance is lower than the electrical resistance of the first current path 130. For example, if the electric resistance of the second current path 140 is about 8 mΩ the total resistance of the parallel connection between the 40 mΩ path and the 8 mΩ is about 6.7 mΩ. Therefore, the voltage drop during charging and discharging operations is significantly reduced, and thus charging and discharging efficiency is improved.

Accordingly, if the battery 200 is operating normally, charging operations are performed with currents as shown in FIG. 3.

In some embodiments, the battery cell 200 is continuously monitored for abnormalities (operation S4), and, if there is no abnormality in the battery cell 200, it is determined whether the charging operation or the discharging operation is completed (operation S5).

However, if it is determined in operation S4 that there is an abnormality, at least one of the discharge control switch SW1 and the charge control switch SW2 is turned off (operation S6). If one of the discharge control signal and the charge control signal is changed, the signal output by the switching control unit 161 is changed, and the short control switch SW3 is turned on. Therefore, the third current path 170 establishes a short-circuit between the positive electrode terminal 121 and the negative electrode terminal 122 of the external connection terminal 120.

Figure 4:
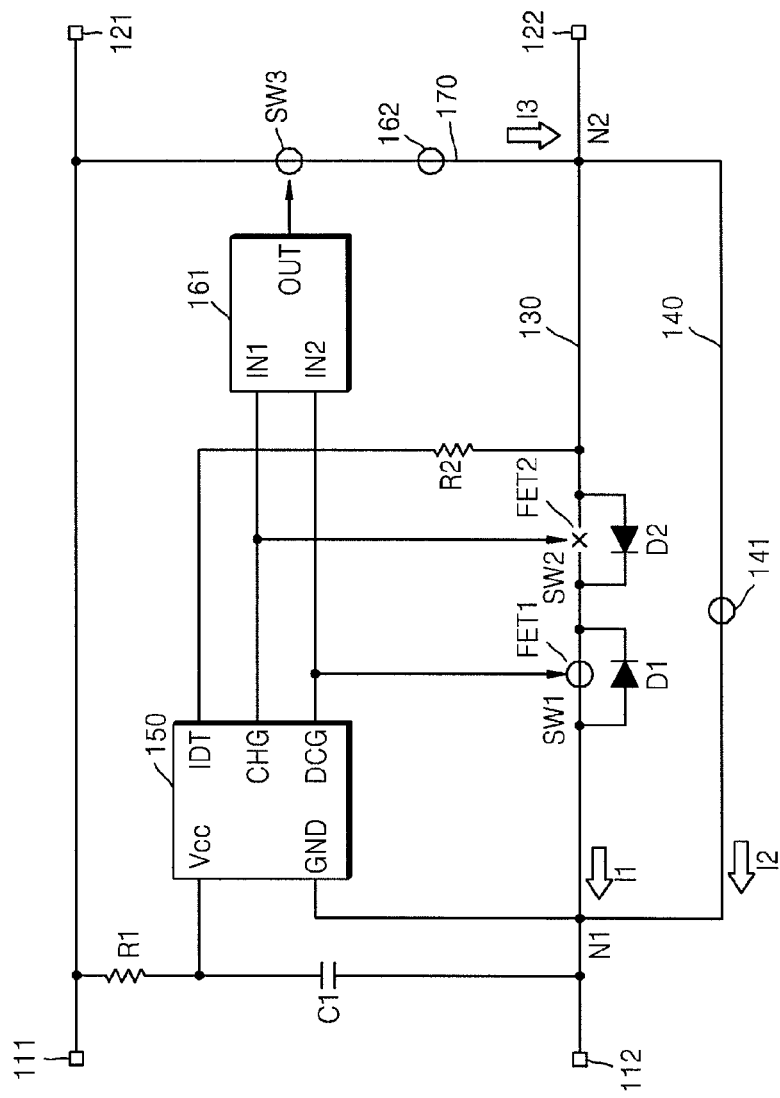

Referring to FIG. 4, when there is an abnormality during a charging operation, the charge control signal is changed from a high level signal to a low level signal, and thus the charge control switch SW2 is turned off. When the charge control switch SW2 is turned off, current flowing from the first node N1 to the second node N2 is blocked.

Since the charge control signal is changed to a low level signal, the switching control unit 161, which is an AND GATE logic device, outputs a low level signal, and thus the short control signal SW3 is turned on.

In other words, a current path connecting the positive electrode of the battery cell 200, the third current path 170, and the first and second current paths 130 and 140 is formed. At this point, current is supplied from the positive electrode of the battery cell 200 to the second node N2 via the third current path 170. The current supplied to the second node N2 flows to the negative electrode of the battery cell 200 via the first current path 130 and the second current path 140.

If the currents flowing in the second current path 140 and the third current path 170 increase due to the short circuit shown in FIG. 4, the temperature of the first current blocking unit 141 increases, and the first current blocking unit 141 is activated (operation S8). For example, a fuse is blown or a temperature of a PTC thermistor exceeds its Curie temperature and the electric resistance thereof significantly increases.

Figure 5:
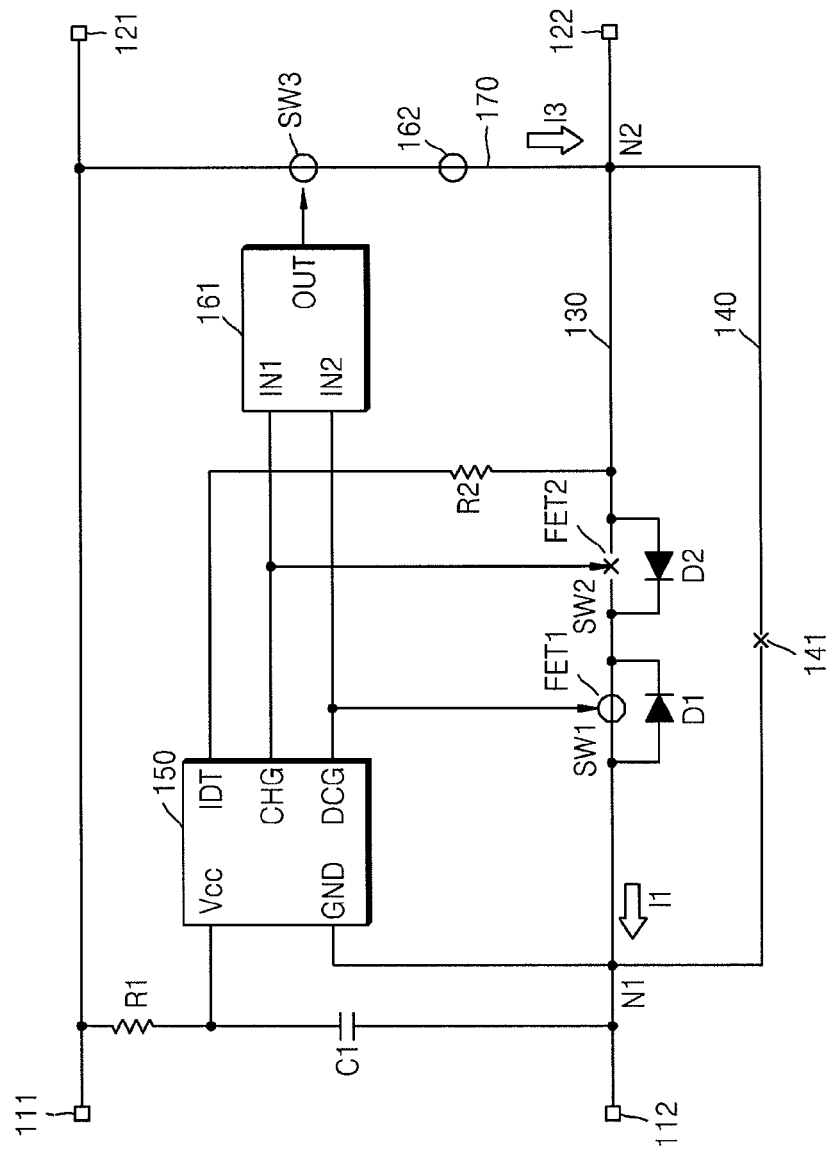

Referring to FIG. 5, the first current blocking unit 141 is activated and blocks flow of current in the short circuit as described above, and thus a current flows only in the first current path 130.

Even if current flowing in the second current path 140 is blocked due to the activation of the first current blocking unit 141, a short circuit via the third current path 170 and the first current path 130 is at least temporarily maintained. As the amount of current increases, the second current blocking unit 162 is activated (operation S9). Similar to the activation of the first current blocking unit 141, a fuse is blown or a temperature of a PTC thermistor exceeds its Curie temperature and an electric resistance thereof significantly increases.

Figure 6:
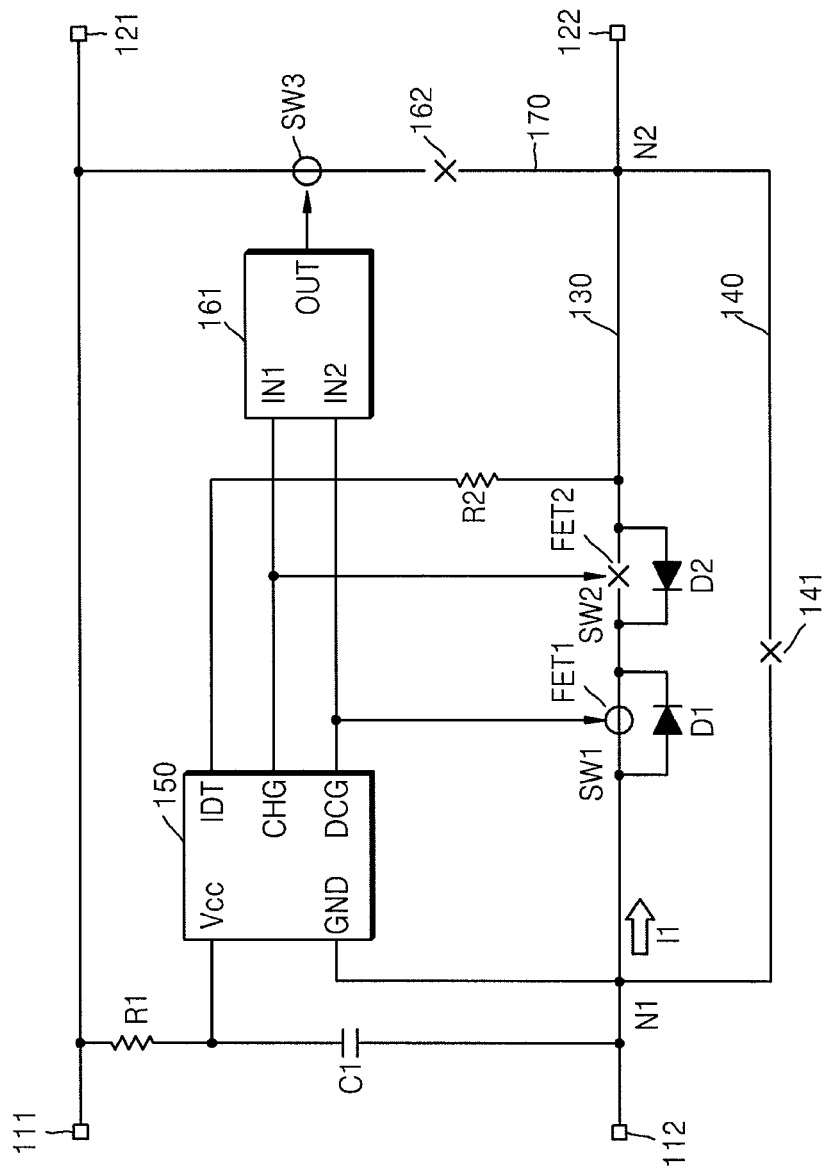

Referring to FIG. 6, due to operations of the first current blocking unit 141 and the second current blocking unit 162, the path temporarily formed in the protection circuit 100 is broken and is no longer conductive. Furthermore, even if a charger is connected to the external connection terminal 120, the charge control switch SW2 is turned off and current flowing from the first node N1 to the second node N2 is blocked, and thus the battery cell 200 is not charged.

After the battery cell 200 returns to a normal state, the charging operation or the discharging operation is performed via the first current path 130, and the charging operation or the discharging operation is terminated after the battery cell 200 is completely charged or discharged (operation S10). In other words, if no abnormality has occurred, the charging operation or the discharging operation is performed by using both the first current path 130 and the second current path 140. However, after an abnormality, only the first current path 130 is used for the charging or discharging operations.

As described above, the protection circuit 100 according various embodiments may have improved charging efficiency and discharging efficiency by reducing impedance of paths in which currents flow during charging operations and discharging operations.

A computer program for executing the method of controlling the protection circuit 100 and modifications thereof in the protection circuit 100 and the battery pack 1 may be stored in a recording medium. The recording medium refers to a processor readable medium, and may be a semiconductor recording medium (e.g. a flash memory). The recording medium may be read and executed by a processor.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery protection circuit, comprising:
   a first current path comprising a charge control switch and a discharge control switch that are connected in series between a first node connected to a first electrode of a battery cell and a second node connected to an external device;
   a second current path between the first node and the second node in parallel with the first current path, wherein the second current path has resistance less than that of the first current path, and wherein the second current path is configured to conditionally block current therein; and
   a control integrated circuit (IC) for controlling current blocking in the first current path.

2. The battery protection circuit of claim 1, wherein the second current path comprises a first current blocking unit that controls blocking of current based on the amount of current flowing in the second current path.

3. The battery protection circuit of claim 2, further comprising a short control unit for short-circuiting a path between the second node and a third node connected to a second electrode of the battery cell.

4. The battery protection circuit of claim 3, wherein the short control unit comprises:

a second current blocking unit that controls blocking of current based on the amount of current flowing between the third node and the second node;
   a short control switch that controls flow of a current between the third node and the second node; and
   a switching control unit that controls operation of the short control switch according to a control signal from the control IC.

5. The battery protection circuit of claim 4, wherein the first current blocking unit and the second current blocking unit each comprise a fuse.

6. The battery protection circuit of claim 5, wherein the fuse in the first current blocking unit is blown by a current less than the current required to blow the fuse included in the second current blocking unit.

7. The battery protection circuit of claim 4, wherein the first current blocking unit and the second current blocking unit each comprise a PTC thermistor.

8. The battery protection circuit of claim 7, wherein the Curie temperature of the PTC thermistor in the first current blocking unit is less than the Curie temperature of the PTC thermistor in the second current blocking unit.

9. The battery protection circuit of claim 4, wherein the switching control unit controls the short control switch based on signals for controlling the charge control switch and the discharge control switch.

10. The battery protection circuit of claim 9, wherein the switching control unit is configured to cause the short control switch to be on if either of the charge control switch and the discharge control switch are off, wherein the first current path passes current and the second current path parallel to the first current path passes current.

11. The battery protection circuit of claim 10, wherein, if there is an abnormality in the battery cell, the second current path is opened to block current from flowing in the second current path.

12. The battery protection circuit of claim 10, wherein the second current path is opened based on the amount of the current flowing in the second current path.

13. The battery protection circuit of claim 10, further comprising a third current path conducting current from the battery cell to the first and second current paths via a third current path in response to an abnormality in the battery cell.

14. The battery protection circuit of claim 13, wherein the third current path is opened based on an amount of the current flowing in the third current path.

15. The battery protection circuit of claim 13, wherein the current conducted via the third current path flows during a time after the second current path is opened.

16. A battery protection circuit, comprising:
    a first current path comprising a charge control switch and a discharge control switch that are connected in series between a first node connected to a first electrode of a battery cell and a second node connected to an external device;
    a second current path between the first node and the second node in parallel with the first current path, wherein the second current path has resistance less than that of the first current path, and wherein the second current path comprises a first current blocking unit;
    a third current path between the second node and a third node connected to the external device, the third current path comprising a short control switch and a second current blocking unit; and
    a control circuit for controlling the charge control switch, the discharge control switch, and the short control switch.

17. The battery protection circuit of claim 16, wherein the short control switch is configured to be on if either of the charge control switch and the discharge control switch are off.

18. The battery protection circuit of claim 17, wherein the integrated circuit is configured to turn off either of the charge control switch and the discharge control switch if there is an abnormality in the battery.

19. The battery protection circuit of claim 16, wherein each of the first and second current blocking units are configured to open based on an amount of current flowing therein.

20. A method of controlling a battery protection circuit for a battery cell, the method comprising:
  passing current in both a first current path and a second current path parallel to the first current path,
  wherein the first current path comprises a charge control switch and a discharge control switch that are connected in series,
  wherein the second current path has a resistance which is less than the resistance of the first current path, and
  wherein, if there is an abnormality in the battery cell, the second current path is opened to block current from flowing in the second current path.

21. A method of controlling a battery protection circuit for a battery cell, the method comprising:
  passing current in both a first current path and a second current path parallel to the first current path,
  wherein the first current path comprises a charge control switch and a discharge control switch that are connected in series,
  wherein the second current path has a resistance which is less than the resistance of the first current path, and
  wherein the second current path is opened based on the amount of the current flowing in the second current path.

* * * * *

UNITED STATES PATENT AND TRADEMARK OFFICE
CERTIFICATE OF CORRECTION

PATENT NO.       : 9,018,910 B2  
APPLICATION NO.  : 13/005167  
DATED            : April 28, 2015  
INVENTOR(S)      : Woo-Choul Kim Page 1 of 1

It is certified that error appears in the above-identified patent and that said Letters Patent is hereby corrected as shown below:

In the Specification,

Column 3, Line 5, please delete "Ni" and insert therefore, --N1--.

Column 3, Line 51, please delete "Ni" and insert therefore, --N1--.

In the Claims,

In Claim 13, Column 8, Lines 42-43, after "paths" please delete "via a third current path".

Signed and Sealed this  
Second Day of February, 2016

Michelle K. Lee  
*Director of the United States Patent and Trademark Office*